Jan. 9, 1968
I. J. HEINEN
3,362,433
FOUR-WAY VALVE
Filed Aug. 30, 1965
2 Sheets-Sheet 1
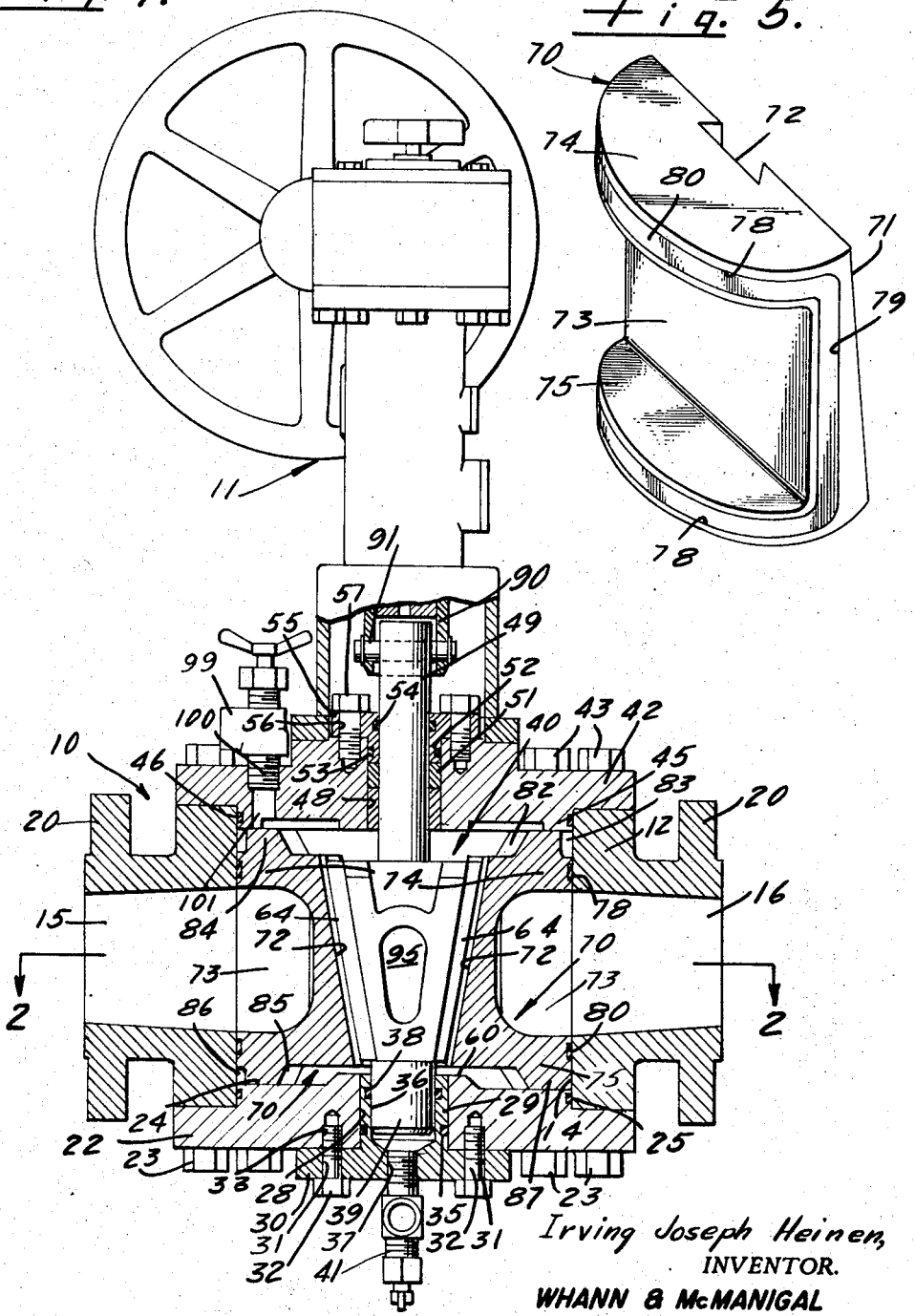
Irving Joseph Heinen,
INVENTOR.
WHANN & McMANIGAL
Attorneys for Applicant

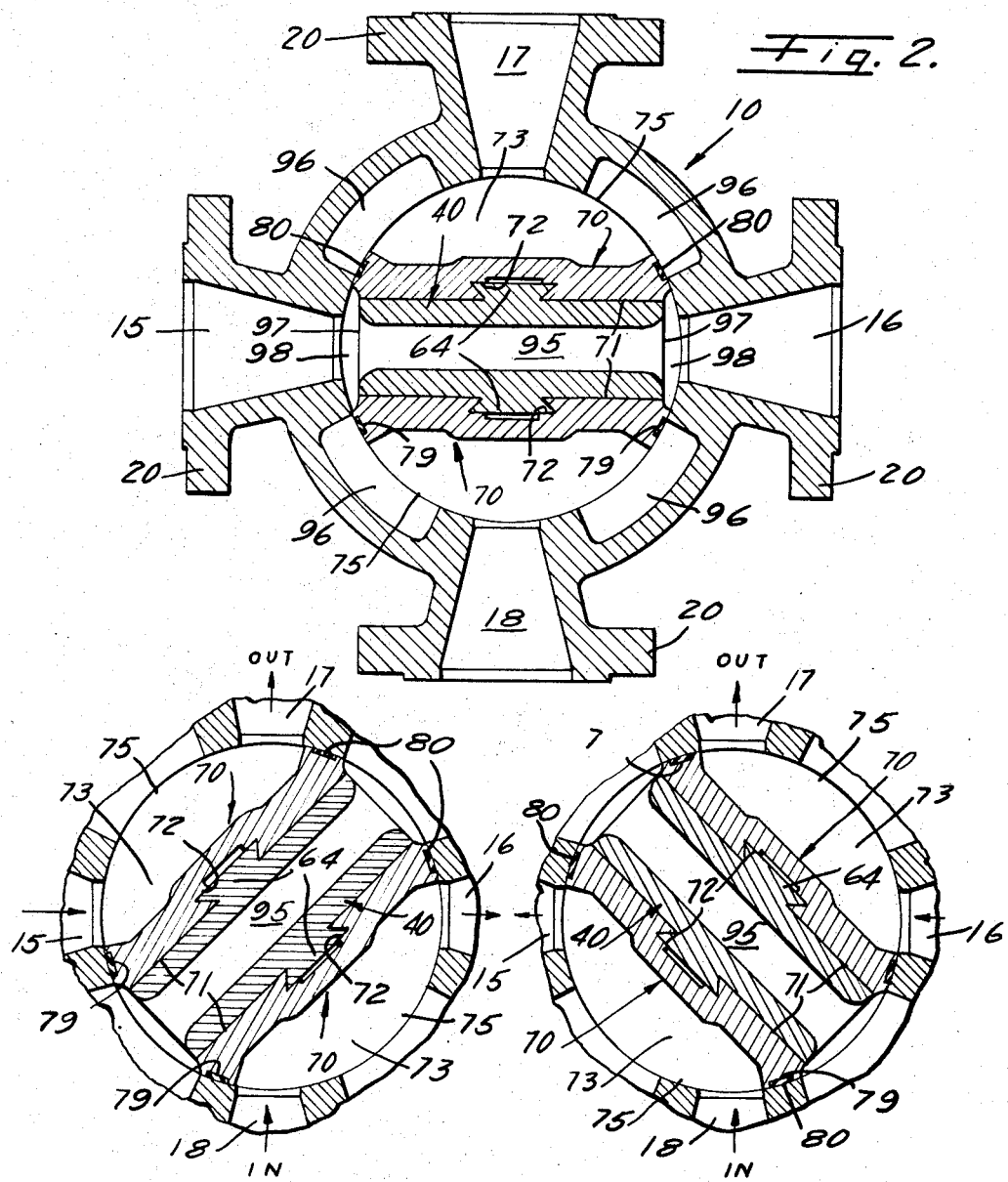

United States Patent Office 3,362,433
Patented Jan. 9, 1968

3,362,433
FOUR-WAY VALVE
Irving Joseph Heinen, 4206 Fleet Haven Road,
Lakewood Estates, Long Beach, Calif.
Filed Aug. 30, 1965, Ser. No. 483,480
10 Claims. (Cl. 137—625.43)

This invention relates generally to valves for controlling fluid flow and relates more particularly to four-way valves for controlling and directing the flow of fluid in a fluid system.

While the invention has particular utility embodied in a four-way valve, and is shown and described thus embodied, it is to be understood that its utility is not confined thereto.

In certain types of fluid systems, such as what is known in the art as meter provers, which are used to check the accuracy of the meters used in metering the quantity of petroleum products, such as oil flowing through a pipe line, or the like, extreme accuracy for meter provers is a primary requirement since a meter that is functioning improperly could register a false amount of fluid flowing through such pipe line. If the meter registers too much or too little fluid flowing through the pipe line, either the purchaser or the seller will lose money.

Because of the extreme accuracy that is required for meter proving systems the valve controlling and directing the flow of fluid through the prover system must not leak. Leakage of the valve would, of course, adversely affect the accuracy of the meter prover system. Heretofore the providing of a valve that meets the requirements for such meter prover systems has presented a real problem and it is therefore an object of the present invention to provide a valve for meter proving systems that solves this problem and overcomes the difficulties involved therein.

It is another object of the invention to provide a fluid flow control and directing valve that when shut is leakproof.

It is still another object of the invention to provide a four-way valve that is adapted for use in meter proving systems.

It is a further object of the invention to provide a four-way valve that will not leak when shut.

It is still another object of the invention to provide a valve of this character that has pressure surge relief means that prevents blockage when the valve plug slips thereof are actuated or rotated from one position to another.

It is a further object of the invention to provide a valve of this character that is relatively inexpensive to manufacture.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a side view of a mechanism having a valve embodying the invention with portions broken away to show the interior construction thereof and valve actuating means;

FIG. 2 is a sectional view taken on line 2—2 of FIG. 1;

FIG. 3 is a schematic or diagrammatic sectional view showing the rotatable valve plug and slips thereof in one operating position;

FIG. 4 is a similar view showing the plug and slips thereof in another operating position; and FIG. 5 is a perspective view of one of the slips.

Referring more particularly to the drawings, there is shown a valve mechanism, indicated generally at 10, and valve actuating means, indicated generally at 11.

Valve 10 comprises a valve body 12, having a cylindrical bore 14 therein open at the ends and providing a valve plug chamber. From the bore 14 are radially extending fluid passages 15, 16, 17 and 18, FIGS. 1 to 4. At the outer ends of these passages the body is provided with respective flanges 20 whereby the valve may be connected with conduits or pipes, not shown.

At one end of the bore 14 is closed by a plate 22 secured to the adjacent end of the body by means of screws 23 disposed in openings or holes, not shown, adjacent the periphery thereof and aligned tapped bores, not shown, in the adjacent end of said body. There is a central portion 24 of said plate that extends into the adjacent end of the bore 14 and is provided with a peripheral groove therein for reception of a sealing ring 25 of any suitable well known character, such as, for example, an O-ring, which provides an effective seal between the central portion 24 and the adjacent wall of the bore 14.

Plate 22 has an axial opening 28 therein for reception of a plug 29 having a flange 30 at the outer end. Flange 30 is provided with a plurality of annularly spaced openings 31 for reception of screws 32, the inner ends of said screws being screwed into tapped openings 33 provided therefor and in alignment or register with the respective holes or openings 31.

Plug 29 has an external peripheral groove for reception of a seal 35, said seal being of any suitable character, such as an O-ring, for example, and providing a seal between the plug and the wall of the bore 28.

The plug 29 has a bore 36 which extends inwardly from the inner end thereof and is closed at the outer end by a wall portion in which is a tapped bore 37 which extends from the inner end of the bore 36 to the outer side of the plug.

There is an interior groove for a seal 38 which seals against the exterior of a stub-shaft 39, extending from one end of a rotatable plug, indicated generally at 40.

A bleed valve 41 has one end screwed into the tapped bore 37. This bleed valve is of well known character and need not be described in detail.

At the opposite or upper end of the body 12 there is a bonnet 42 having annularly spaced openings, not shown, adjacent the periphery thereof for reception of screws 43 having their inner ends screwed into tapped bores, not shown, aligned with the openings or holes in the body.

The bonnet is provided with a central portion 45 which extends a limited distance into the upper end of the bore 14 and is provided with an external annular groove for reception of a sealing element 46, which may be an O-ring or the like.

Bonnet 42 is provided with an axial bore 48 through which stem 49 of the plug 40 extends, said stem being in axial alignment with the stub shaft 39 and the plug 40.

Bore 48 is of larger diameter than the diameter of the stem 49 and adjacent the inner end of the said bore is a bushing 50 disposed on said stem and providing bearing means therefor. Bushing 50 is of less length than the length of bore 48 and above said bushing is disposed a packing element 51 which may be of the chevron type.

A packing gland 52 is disposed in the outer end portion of the bore 48 and has its inner end in engagement with the packing 51. Packing gland 52 is provided with an external groove for reception of a seal 53 and is also provided with an internal groove for reception of a seal 54, whereby seals are provided between the packing gland and the bore 48 and said gland and stem 49. Packing gland 52 is provided with a flange 55 at its outer end, said flange having openings 56 therein for reception of screws 57 having their inner ends screwed into tapped openings provided therefor in the adjacent end of the bonnet and aligned with said bores or openings 56.

The central portions 24 and 45 of the bottom plate 22 and the bonnet 42 are spaced axially apart in the bore 14 and plug 40 is disposed between said central parts. This plug is of less length than the distance between the inner surfaces of said central portions 24 and 45, so that said plug may move longitudinally or axially within the bore 14, which may be considered a valve chamber. There is means limiting upward and downward axial movement of the plug and such means comprises an inwardly extending annular projection 60 of the plate 22 and an annular axially arranged flange 61 at the inner side of the bonnet 42.

Plug 40 is wedge-shaped, as shown in FIG. 1, having oppositely arranged flat sides that are inclined downwardly and inwardly in parallel relationship to each other. Each side of the plug has a dove-tail spline or tenon 64 extending from one end to the other.

At each side of the plug is a slip, indicated generally at 70, that is arcuate in shape. These slips are of similar construction so that a description of one will be sufficient.

Referring to FIG. 5, the slip has a flat side 71 with a dove-tail groove or mortise 72 extending from one end to the other and in which a spline or tenon 64 is slidable. The side 71 of the slip is adapted to be slidably disposed against a flat side of the plug when the tenon is disposed in the mortise 72, it being noted that said side 71 has the same angular inclination as the adjacent outer side of the plug except that said side 71 inclines in the opposite direction so that the sides are complementary to each other. Each slip has a chordal recess or slot 73 in the outer side, thereby leaving upper and lower flanges 74 and 75 at the upper and lower ends of said recess and at the upper and lower ends of said slip.

There is an external continuous groove in this slip which includes parts 78 in the peripheral edges of the flanges 74 and 75 and vertical portions 79 in the body of the slip adjacent the ends of the notch or slot 73. A seal 80 of suitable material and of the same shape as said continuous groove is disposed therein so that said seal is effective at the top and bottom of the notch or slot 73 and at the ends thereof.

The plug 40 and oppositely arranged slips 70 thereon comprise a plug assembly. When disposed within the bore or chamber 14 of the valve body the upper and lower ends of said slips slidably abut against the inner faces of the central portions 24 and 45 of the plate 22 and bonnet 42, so that said slips are held against axial or longitudinal movement but rotatably slide on said surfaces of the central portions 24 and 45.

The upper ends of the slips have interiorly relieved portions 82 and arcuately extending external grooves 83, so that end portions 84 of the slips present a relatively small surface area engageable with the adjacent surfaces of the plate and bonnet to thereby reduce friction. The slips are similarly relieved interiorly at 85 and exteriorly at 86, thereby providing reduced surface areas of parts 87 engageable with the adjacent portions of the plate 22.

When the plug is moved from a lower position to an upper position the slips are pulled inwardly from seating engagement against the inner walls or wall portions of the bore or chamber 14, the seating position of said slips being shown in FIGS. 1 through 4. When the slips have been pulled inwardly the plug assembly may be readily rotated from one operative position to another, as will be more fully described hereinafter. After the plug assembly has been rotated from one operative position to another the plug is moved downwardly to thereby move the slips outwardly and against the interior wall of the bore 14, at which time the seal 80 provides an effective seal against leakage about the inner end of the respective passages 15 and 16.

The actuator or operator mechanism 11 is secured to the bonnet 42 by any suitable means, such as bolts or screws, not shown. This operator or actuator mechanism 11 may be of any suitable character, one such mechanism being disclosed in the Heinen et al. Patent No. 2,795,960, for Valve Actuating Means, issued June 18, 1957.

This actuator includes a member 90 connected to the upper end of the stem 49 by means of a pivot pin 91 and said actuator is operable to axially move the plug 40 and to rotate the plug assembly.

Referring to FIGS. 3 and 4, let it be assumed that passage 18 of the valve is connected to a fluid carrying conduit and passages 15 and 16 are connected to opposite ends of the meter prover, while passage 17 is connected to the fluid carrying conduit downstream of the connection of said conduit with the passage 18. A valve is connected in said conduit between the connections with the passages 18 and 17.

With the valve assembly in the position shown in FIG. 3, fluid will flow from the upstream connection through the passage 18, to the passage 16, by way of the notch across the exterior of the adjacent slip. From passage 16 the fluid will flow to one end of the meter prover and actuate same. Fluid from the other end of the meter prover is carried by conduit means to passage 15 and to passage 17 by way of the exterior recess or notch in the adjacent slip. From the passage 17 this fluid will, of course, flow to the main conduit downstream of the valve therein.

When it is desired to reverse the fluid flow relative to the meter prover, the plug 40 is raised to thereby pull the slips inwardly away from the wall of the bore or chamber 14. In other words, the plug is pulled upwardly, as shown in FIG. 1, and when it reaches its upper limit of movement against the flange 61 the actuating mechanism 11, which has raised the plug 40, effects rotation of the plug assembly to the position shown in FIG. 4. The plug 40 is then moved downwardly to force the slips outwardly into sealing engagement with the wall of the bore or the chamber 14. Fulid from the main conduit and upstream of the valve therein flows into the passage 18 of the present valve and to the passage 15 through the exterior notch of the adjacent slip. From passage 18 fluid flows to the end of the meter prover opposite the end through which fluid was provided when the valve mechanism was in the position shown in FIG. 3. Fluid from the last mentioned end of the meter prover then flows into the passage 16 and to the passage 17 by way of the exterior notch of the adjacent slip. From passage 17 the fluid is delivered to the main fluid conduit downstream of the valve therein.

In order to prevent back-pressure in the valve, such as might interfere with the operation thereof, the plug 40 is provided with a diametrically extending passage 95 therethrough and the valve body is provided with interior recesses 96 positioned between the inner ends of the respective passages 15, 16, 17 and 18. The vertical edges 97 of the plug 40 are spaced inwardly of the wall of the bore or chamber 14, thereby providing spaces 98 at the ends of the passage 95 so that pressure will be relieved within the valve to thereby prevent interference with the proper operation thereof.

Referring to FIG. 1, there is a pressure-relief valve 99 provided in the bonnet and having a threaded end portion 100 screwed into a tapped outer end portion of a bore 101 through the bonnet. The inner end of said bore 101 communicates with the interior of the chamber or bore 14 at its upper end.

In use the bleeder valve 99 is open when the valve is shut to be sure there is no leakage from one set of ports to the other set of ports.

It is to be understood, of course, that the conventional seat and reseat operator or actuator 11 will function as above described to move the valve assembly between the FIG. 3 position and the FIG. 4 position as desired.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific forms shown or uses mentioned except as defined in the accompanying claims, wherein various portions have been separated for clarity of reading and not for emphasis.

I claim:

1. In a fluid flow control valve:
   (A) a valve body having a bore therein for a valve plug assembly, said body having a plurality of ports communicating with said bore;
   (B) wall means closing the respective ends of said bore, one wall means having an axial stem receiving opening therethrough;
   (C) and a valve plug and slip assembly in said bore, comprising
      (a) a valve plug having a stem operably disposed in the opening through the one wall means, said plug being of less length than the distance between the inner sides of said end wall means so that said plug may be moved longitudinally in said bore, said plug also being rotatable and having oppositely arranged flat sides inclined inwardly from one end and toward each other,
      (b) an arcuate slip at each side of said plug, the ends of said slips operably engaging respective adjacent end wall means for retaining said slips against longitudinal movement in said bore,
      (c) each slip having a flat side correspondingly inclined relative to the adjacent flat side of the plug and slidable thereon,
      (d) the outer side of each slip, the side opposite the flat side, having a recess therein closed at the longitudinal ends by arcuate radially extending parts at the longitudinal ends of the slip, the radius of the arcs of said parts being substantially the same as the radius of the bore in the valve body,
      (e) means for retaining said slips in sliding engagement with the flat sides of the plug,
      (f) there being an external groove in each of said parts, and grooves adjacent the ends of said recesses interconnecting adjacent ends of the grooves in said parts,
      (g) and a sealing element operably disposed in said grooves;
   (D) longitudinal movement of said plug effecting respective radial movements of said slips for moving said slips between an inner position whereat the outer arcuately curved parts thereof are spaced inwardly from the wall of the bore, and an outer position whereat said outer parts are so positioned with respect to the wall of the bore as to bring the seals into sealing engagement with the bore wall,
   (E) said plug and slip assembly, when the slips are at the inner position, being rotatable between at least two positions at each of which the recesses of said slips are aligned with a pair of ports,
   (F) the recesses of said slips when said slips are at outer positions providing a fluid connection with pairs of ports with the seals of said slips engaging the wall of the bore and preventing fluid leakage between said slips and bore wall and hence preventing fluid leakage between said recesses and the ports said recesses connect together.

2. The invention defined by claim 1, including actuator means having a part connected with the stem of the plug for moving said plug longitudinally for effecting inward and outward radial movements of the slips, and for rotating the plug and slip assembly, when the slips are spaced from the wall of the bore, from one of said two positions whereat the recesses are aligned with a pair of ports to the other of said two positions.

3. The invention defined by claim 1, wherein the plug has an axial stub shaft at the end opposite the stem, and said one end wall of the bore is a bonnet having the stem receiving opening therein, the other end wall being a plate having an internal recess therein in which said stub shaft is operably disposed for rotatable and axial movement.

4. The invention defined by claim 1, including a vent valve at each end of the bore in the valve body and connected with respective ends of said bore.

5. The invention defined by claim 1, including means for relieving internal pressure when the valve and slip assembly is actuated.

6. The invention defined by claim 5, wherein the means for relieving internal pressure in the valve includes a pressure relief passage through the plug, the ends of which open between the flat sides of said plug.

7. The invention defined by claim 6, wherein the interior of the body has recesses between the ports aligned with the pressure relief passage through the plug.

8. The invention defined by claim 6, wherein the dimension of the plug longitudinally of the relief passage therein is less than the diameter of the bore in the valve body so that the sides of the plug at the ends of the relief passage are spaced from the adjacent wall of the chamber.

9. A four-way fluid flow control valve, comprising:
   (A) a valve body having a vertical cylindrical chamber therein; said body having four ports communicating with said chamber, said ports being annularly spaced apart approximately 90° from each other;
   (B) a bonnet closing the upper end of said chamber, said bonnet having an axial stem receiving bore therethrough;
   (C) a plate closing the lower end of said chamber and having an internal axial recess with a reduced diameter opening to the outer side of said plate;
   (D) and a valve plug and slip assembly in said chamber comprising
      (a) a valve plug having an axial stem at one end operably disposed in the bore thereof and an axial stub shaft at the opposite end operably disposed in the internal recess of said plate,
      (b) said plug being of less length than the distance between the bonnet and plate so that said plug may be actuated longitudinally, said plug also being rotatable,
      (c) said plug having oppositely arranged flat sides inclined downwardly from the upper end and inwardly toward each other,
      (d) and a vertical tenon on each side of the plug;
      (e) an arcuate slip at each side of said plug, the respective ends of said slips slidably engaging the bonnet and plate for restraining said slips against longitudinal movement in said chamber,
      (f) each slip having a flat side correspondingly inclined relative to the adjacent flat side of the plug and slidable thereon,
      (g) a vertical mortise groove in the flat side of each slip in which the tenon of the adjacent side of the plug is slidably received, (h) the side of each slip opposite its flat side having a chordal recess therein closed at the longitudinal ends by radially extending arcuate flanges at the ends of the slip, the radius of said flanges corresponding to substantially the radius of said chamber, (i) there being an external groove in each of said flanges along the arcuate side thereof, and vertical grooves adjacent to but outwardly of the ends of said recesses interconnecting adjacent ends of the grooves in said flanges, (j) and a sealing element operably disposed in said grooves, (E) upward and downward movement of said plug effecting respective inward and outward radial movements of said slips between an outer sealing position whereat the arcuate faces of the flanges are closely adjacent the cylindrical wall of the chamber with the seals in sealing engagement with the cylindrical wall of the chamber and an inner position whereat the arcuate faces of the flanges are spaced inwardly from said cylindrical chamber wall, (F) said plug and slip assembly, when the slips are at the inner position, being rotatable between two positions, at each of which the recesses of said slips are aligned with a pair of adjacent ports, (G) the recesses of said slips, when said slips are at their outer positions, providing a fluid connection with respective pairs of adjacent ports with which said recesses are aligned by rotative movement of said plug and slip assembly, the seals of said slips engaging the cylindrical wall of the chamber for preventing fluid leakage between said slips and cylindrical chamber wall and hence preventing fluid leakage between said recesses and ports said recesses connect together;

(H) an openable vent valve connected with the reduced diameter part of the recess in the end plate; and (I) an openable vent valve connected with the interior of the upper end of the chamber through an opening provided therefor in the bonnet.

10. The invention defined by claim 9, including an actuator for raising said plug to retract the slips inwardly, rotating the plug and slip assembly from one port aligned position to another, and lowering said plug to move the slips outwardly into sealing position with the adjacent wall of the chamber.

References Cited
UNITED STATES PATENTS

| | | | |
|---|---|---|---|
| 2,612,340 | 9/1952 | Laurent | 251—163 X |
| 3,191,628 | 6/1965 | Kirkwood | 137—625.43 |
| 3,269,414 | 8/1966 | Mayo | 137—625.43 X |

CLARENCE R. GORDON, *Primary Examiner.*